United States Patent
Nishi et al.

(10) Patent No.: US 11,548,328 B2
(45) Date of Patent: Jan. 10, 2023

(54) VEHICLE WHEEL

(71) Applicant: HONDA MOTOR CO., LTD., Tokyo (JP)

(72) Inventors: Masaaki Nishi, Wako (JP); Youichi Kamiyama, Wako (JP); Toshinobu Saito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 979 days.

(21) Appl. No.: 16/295,040

(22) Filed: Mar. 7, 2019

(65) Prior Publication Data

US 2019/0275847 A1 Sep. 12, 2019

(30) Foreign Application Priority Data

Mar. 9, 2018 (JP) .............................. JP2018-043400

(51) Int. Cl.
*B60B 21/12* (2006.01)
*B60C 19/00* (2006.01)

(52) U.S. Cl.
CPC ............ *B60C 19/002* (2013.01); *B60B 21/12* (2013.01); *B60B 2310/318* (2013.01); *B60B 2320/52* (2013.01); *B60B 2900/131* (2013.01); *B60B 2900/133* (2013.01)

(58) Field of Classification Search
CPC . B60C 19/002; B60B 21/12; B60B 2310/318; B60B 2320/52; B60B 2900/131; B60B 2900/133
See application file for complete search history.

(56) References Cited

U.S. PATENT DOCUMENTS

| 9,431,000 | B2 * | 8/2016 | Kamiyama | .......... G10K 11/172 |
| 2009/0108666 | A1 | 4/2009 | Kashiwai et al. | |
| 2011/0057505 | A1 | 3/2011 | Nagata et al. | |
| 2013/0276968 | A1 * | 10/2013 | Moore | ................... B29D 30/02 156/245 |
| 2016/0151993 | A1 | 6/2016 | Ikeda et al. | |

FOREIGN PATENT DOCUMENTS

| JP | 2006256535 A | * | 9/2006 | |
| JP | 2009-107357 A | | 5/2009 | |
| JP | 2011-057006 A | | 3/2011 | |
| JP | 2012-045971 A | | 3/2012 | |
| JP | 2014-201205 A | | 10/2014 | |
| JP | 2014201205 A | * | 10/2014 | |
| WO | WO-2004085177 A1 | * | 10/2004 | ......... B60C 23/0408 |
| WO | 2015/008771 A1 | | 1/2015 | |

OTHER PUBLICATIONS

Office Action received in corresponding Japanese application No. 2018-043400 dated Oct. 5, 2021 with English translation (7 pages).

* cited by examiner

*Primary Examiner* — Scott A Browne
(74) *Attorney, Agent, or Firm* — Rankin, Hill & Clark LLP (57) ABSTRACT

A vehicle wheel includes: a well portion having an outer peripheral surface on which a vertical wall extending in a circumferential direction of the vehicle wheel is formed; and a Helmholtz resonator attached to a side surface of the vertical wall and to the outer peripheral surface of the well portion with an adhesive.

5 Claims, 10 Drawing Sheets

VEHICLE WHEEL

CROSS-REFERENCE TO RELATED APPLICATIONS

The present application claims priority under 35 U.S.C. § 119 to Japanese Patent Application No. 2018-043400, filed on Mar. 9, 2018, the contents of which are hereby incorporated by reference in their entirety.

BACKGROUND OF THE INVENTION

1. Field of the Invention

The present invention relates to a vehicle wheel.

2. Description of the Related Art

There has heretofore been known a Helmholtz resonator which is disposed on an outer peripheral surface of a well portion of a wheel and which includes two edge portions projecting in a wheel width direction and being locked with circumferential grooves of a rim (see Japanese Patent Application Publication No. 2012-45971).

When the Helmholtz resonator is pressed against the outer peripheral surface of the well portion, two edge portions of the Helmholtz resonator are elastically deformed and thus easily fitted into the circumferential grooves. Accordingly, the above-described Helmholtz resonator can be easily attached to the wheel.

SUMMARY OF THE INVENTION

This means that a conventional wheel provided with the aforementioned Helmholtz resonator (see Japanese Patent Application Publication No. 2012-45971, for example) needs to undergo cutting work in order to form the circumferential grooves in the rim for attaching the resonator. As a consequence, this wheel is likely to face a problem of a complicated manufacturing process and a resultant increase in manufacturing cost. In this regard, a possible solution for the problem is a resonator attachment structure designed to fix the Helmholtz resonator onto the outer peripheral surface of the well portion by using an adhesive, for example.

However, when a vehicle equipped with tires attached to such wheels travels, the Helmholtz resonator attached to the outer peripheral surface of the well portion is subjected to an extremely large centrifugal force generated by high speed revolutions of the tire. For this reason, the Helmholtz resonator with its bottom surface bound to the outer peripheral surface of the well portion with the adhesive bulges outward in a radial direction of the wheel due to the centrifugal force, and the volume of its sub-air chamber is increased accordingly. As a consequence, the vehicle wheel causes a new problem of a change in the resonance frequency of the Helmholtz resonator from its designed value due to the variation in the volume of the sub-air chamber while the vehicle is moving.

In view of the above, an object of the present invention is to provide a vehicle wheel that brings about further improvement in the rigidity of a Helmholtz resonator attached to a rim by using an adhesive.

To achieve the object, an aspect of the present invention is a vehicle wheel that includes: a well portion having an outer peripheral surface on which a vertical wall extending in a circumferential direction of the vehicle wheel is formed; and a Helmholtz resonator attached to a side surface of the vertical wall and to the outer peripheral surface of the well portion with an adhesive.

Another aspect of the vehicle wheel according to the present invention is that the Helmholtz resonator includes: a bottom portion bonded to the outer peripheral surface of the well portion; a top portion that is opposed to the bottom portion and defines, together with the bottom portion, a sub-air chamber therebetween; and bridges connecting between the bottom portion and the top portion.

The vehicle wheel of the present invention can further improve the rigidity of the Helmholtz resonator attached to the rim by adhesion.

DETAILED DESCRIPTION OF THE EMBODIMENTS

Next, a vehicle wheel according to an embodiment of the present invention will be described below in detail with reference to the accompanying drawings as appropriate. In reference to FIG. 1 to FIG. 12, "X" indicates a wheel circumferential direction, "Y" indicates a wheel width direction, and "Z" indicates a wheel radial direction, respectively. In terms of the wheel width direction Y, an inner side is referred to as "one side" and an outer side is referred to as "another side".

First, a description will be given below of an overall configuration of the vehicle wheel. Next, descriptions will be given of a sub-air chamber member serving as a Helmholtz resonator and of an attachment structure of the sub-air chamber member attached to a rim with an adhesive.

Overall Structure of Vehicle Wheel

Figure 1:
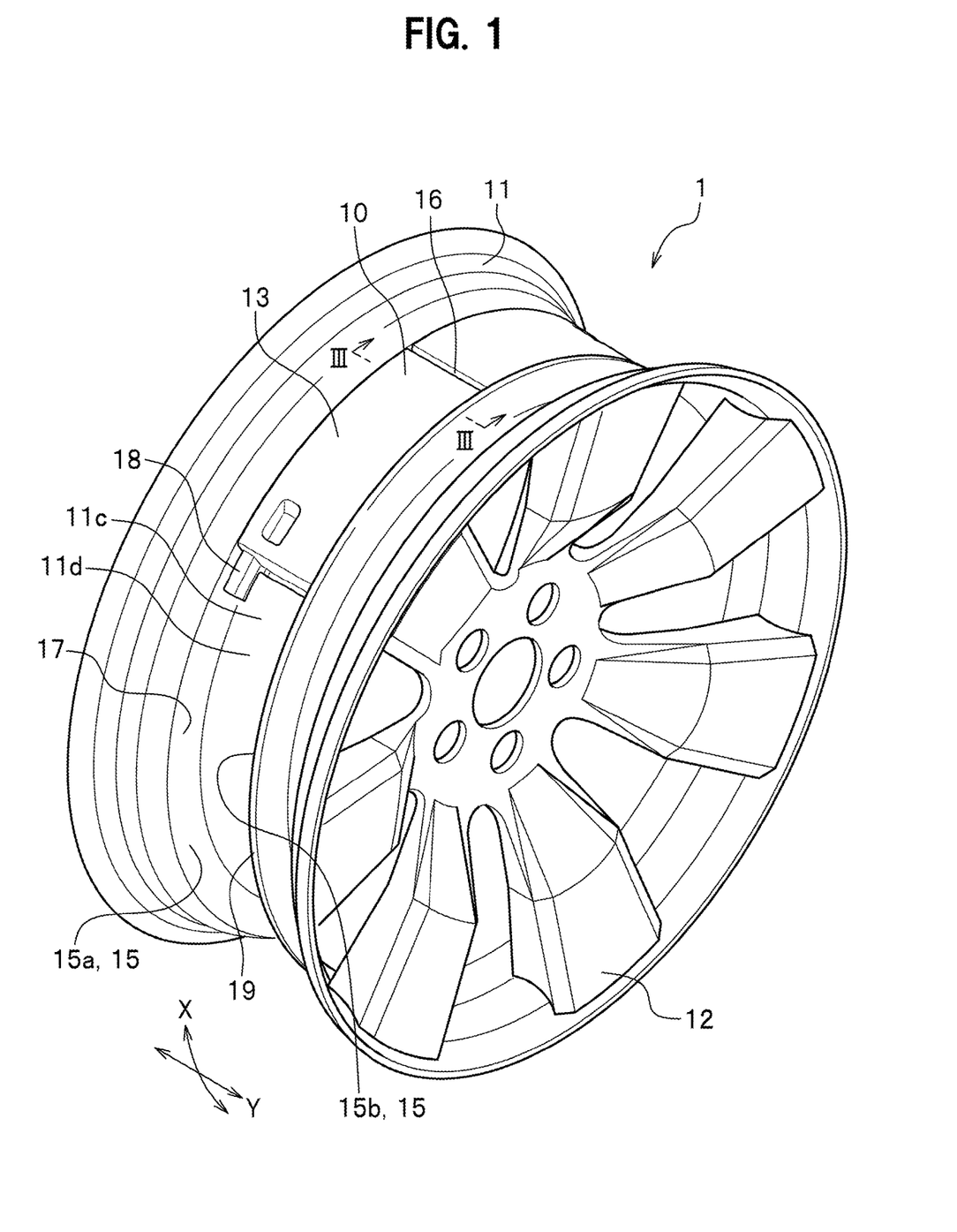
FIG. 1 is a perspective view of a vehicle wheel according to an embodiment of the present invention.

FIG. 1 is a perspective view showing a vehicle wheel 1 according to an embodiment of the present invention.

As shown in FIG. 1, the vehicle wheel 1 of the present embodiment has a configuration in which a sub-air chamber member 10 (Helmholtz resonator) made of a synthetic resin such as a polyamide resin is attached to a rim 11 made of a metal such as an aluminum alloy or a magnesium alloy.

In FIG. 1, reference sign 12 denotes a disc used for connecting the rim 11 to a hub not illustrated.

The rim 11 has two end portions opposite in the wheel width direction Y at each of which a bead seat is formed, and has a well portion 11c recessed inward in the wheel radial direction (toward the center of rotation) between the bead seats. A bottom surface of this recess defines an outer peripheral surface 11d of the well portion 11c, which has a substantially constant diameter about the wheel axis along the wheel width direction Y.

The rim 11 of the present embodiment includes a vertical wall 15a and a vertical wall 15b. These vertical walls 15a and 15b stand from the outer peripheral surface 11d outward in the wheel radial direction with a predetermined interval therebetween in the wheel width direction Y.

Incidentally, the vertical wall 15a formed on the one side (inner side) in the wheel width direction Y is formed at a rising portion 17 that rises from the outer peripheral surface 11d of the well portion 11c toward a rim flange. The vertical wall 15b is defined by a circumferential wall 19 that extends in the wheel circumferential direction X along a circumferential line of the outer peripheral surface 11d located substantially middle in the wheel width direction Y. In the following description, the vertical wall 15a and the vertical wall 15b may be collectively referred to as vertical walls 15 when it is not necessary to distinguish them from each other.

The vertical walls 15a and 15b each extend annularly in the wheel circumferential direction X with a predetermined interval therebetween, thereby defining later-described side surfaces 14 (see FIG. 3) that are opposed to each other. Each of the side surfaces 14 makes a substantially right angle with the outer peripheral surface 11d (see FIG. 3).

Sub-Air Chamber Member

Next, a description will be given of the sub-air chamber member 10.

Figure 2:
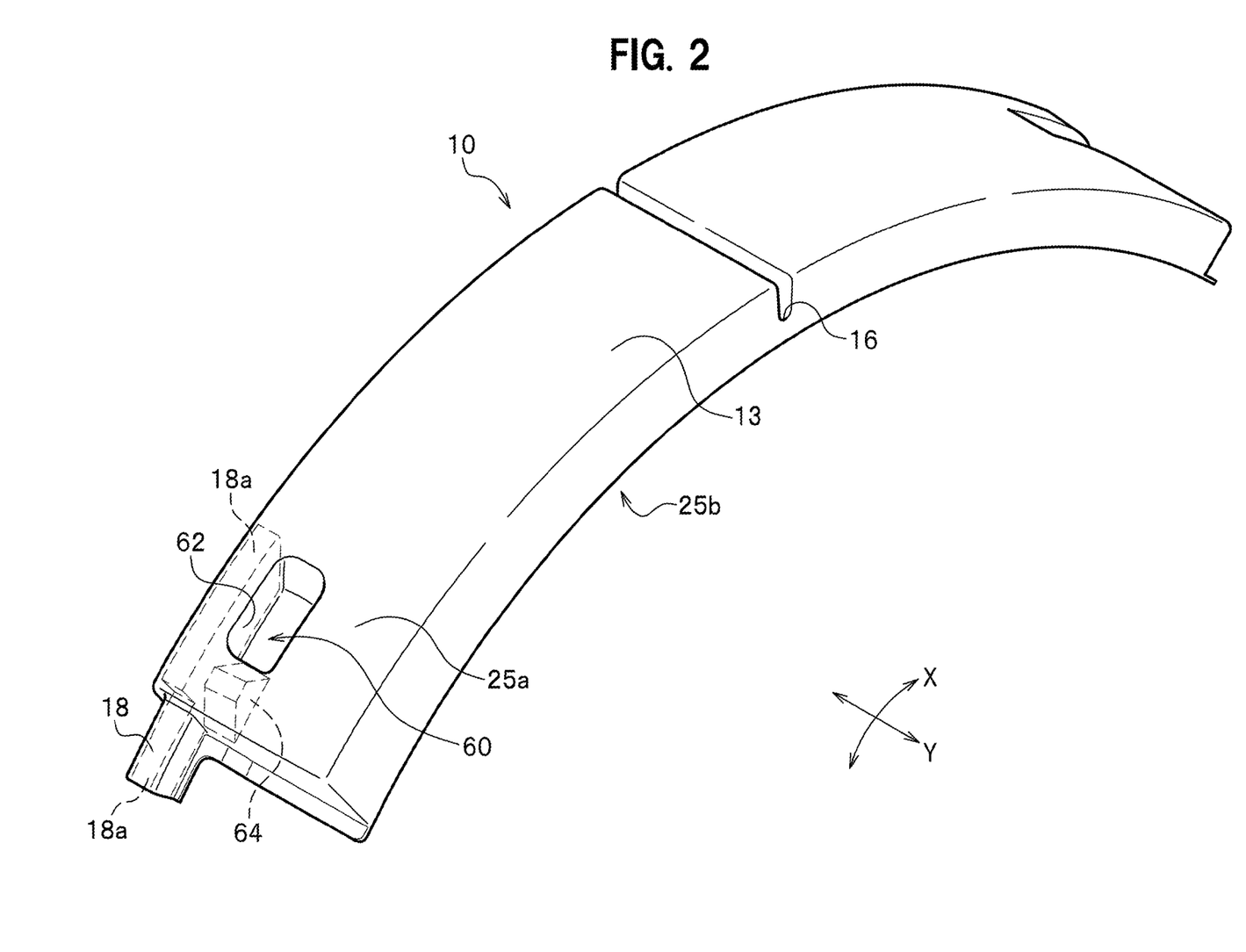
FIG. 2 is an overall perspective view of a sub-air chamber member.
Figure 3:
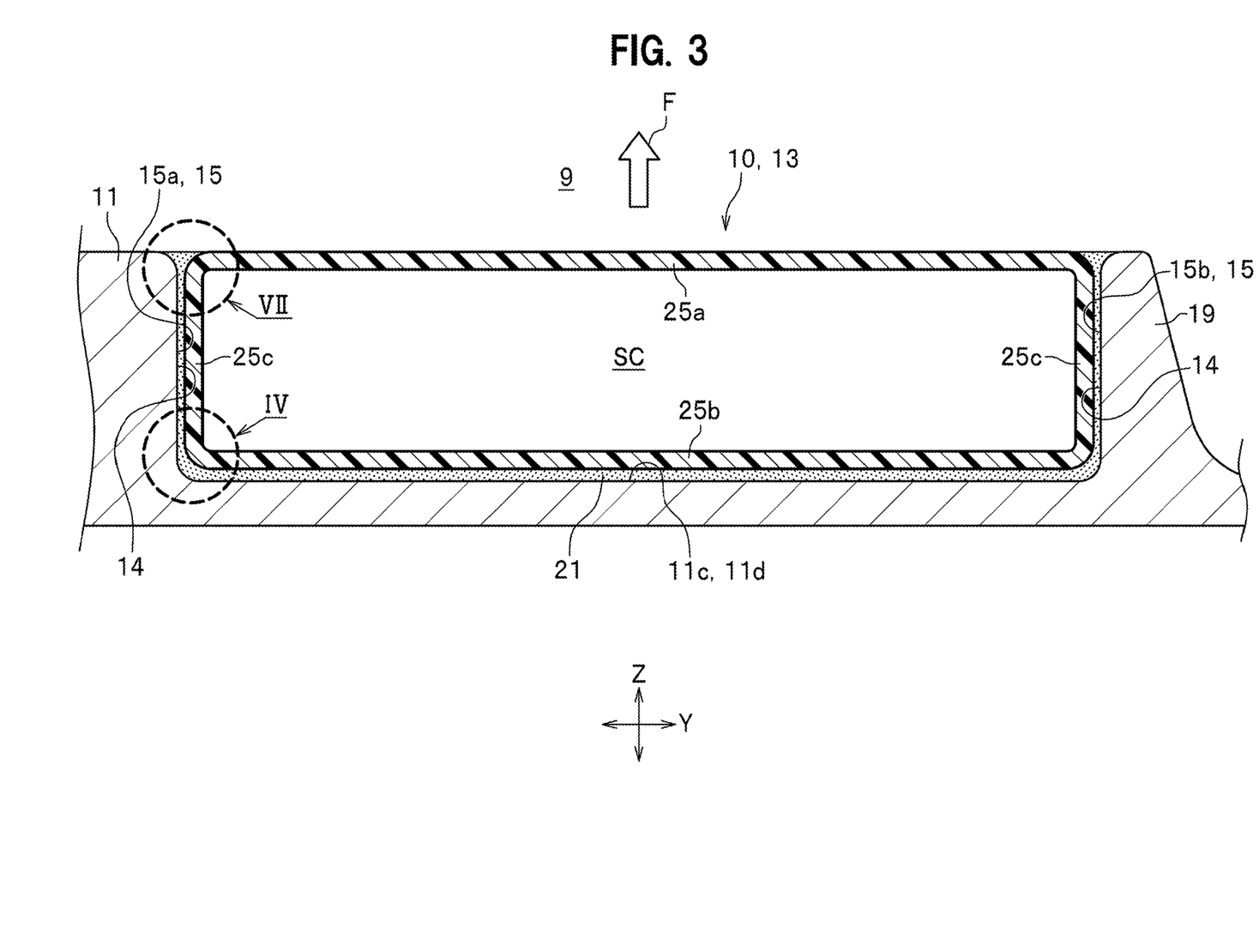
FIG. 3 is a cross-sectional view taken along line in FIG. 1.

FIG. 2 is an overall perspective view of the sub-air chamber member 10. FIG. 3 is a cross-sectional view taken along line in FIG. 1.

As shown in FIG. 2, the sub-air chamber member 10 is a member that is elongated in one direction and includes a body portion 13 and tube bodies 18. The sub-air chamber member 10 has a partition wall 16 extending in the wheel width direction Y in the middle of the body portion 13, and has a shape symmetrical about the partition wall 16 in the wheel circumferential direction X.

The body portion 13 is longitudinally curved. In other words, the body portion 13 extends along the wheel circumferential direction X when the sub-air chamber member 10 is attached to the outer peripheral surface 11d of the well portion 11c (see FIG. 1).

The body portion 13 has a hollow space inside. This hollow space (not illustrated) constitutes a sub-air chamber SC (see FIG. 3) described later. The hollow space is partitioned by the partition wall 16 in the wheel circumferential direction X into two areas.

As shown in FIG. 3, the body portion 13 has a substantially rectangular shape elongated in the wheel width direction Y in a cross-sectional view orthogonal to the longitudinal direction (wheel circumferential direction X shown in FIG. 2) of the body portion 13.

Specifically, the body portion 13 includes a bottom portion 25b (bottom plate) disposed along the outer peripheral surface 11d of the well portion 11c, side portions 25c (side plates) disposed respectively along the side surfaces 14 of the pair of vertical walls 15, and a top portion 25a (top plate) located opposite to the bottom portion 25b, which are integrally connected to one another to have a substantially rectangular shape.

A predetermined gap is provided between the outer peripheral surface 11d of the well portion 11c and the bottom portion 25b as well as between the side surface 14 of each vertical wall 15 and the corresponding side portion 25c, so as to allow interposition of an adhesive 21 with a later-described film thickness.

A height (height in the wheel radial direction Z) of the body portion 13 from the outer peripheral surface 11d is substantially the same as a height of the vertical walls 15 in the present embodiment.

The top portion 25a, the bottom portion 25b, and the side portions 25c described above define the sub-air chamber SC inside the body portion 13 in a surrounding manner.

Next, the tube bodies 18 (see FIG. 1) will be described.

As shown in FIG. 1, each tube body 18 is formed on the body portion 13 at a portion thereof located on a side of the one side (inner side of the vehicle wheel 1) in the wheel width direction Y, so as to project in the wheel circumferential direction X from the body portion 13.

As described, the sub-air chamber member 10 of the present embodiment has a shape symmetrical about the partition wall 16 in the wheel circumferential direction X. In this context, although FIG. 1 illustrates only one tube body 18, the tube bodies 18 of this embodiment are arranged on the body portion 13 at two opposite portions thereof located symmetrically opposite to each other in the longitudinal direction (wheel circumferential direction X) so as to form a pair.

As shown in FIG. 2, a communication hole 18a is formed inside the tube body 18.

The communication hole 18a extends from the inside of the tube body 18 and further extends inside the body portion 13. The portion of the communication hole 18a that extends inside the body portion 13 is formed by partially segmenting the hollow space of the body portion 13 with a dividing wall 62. Incidentally, the dividing wall 62 of the present embodiment is defined by a recess 60, which is recessed from the top portion 25a toward the bottom portion 25b, and a recess 64, which is recessed from the bottom portion 25b toward the top portion 25a.

The above-described communication hole 18a establishes communication between the sub-air chamber SC (see FIG. 3) formed inside the body portion 13 and a tire air chamber 9 (see FIG. 3) formed above the well portion 11c and between the well portion 11c and a tire (not shown).

The sub-air chamber member 10 of the present embodiment is a blow-molded product using a synthetic resin such as a polyamide resin as mentioned earlier. Here, although the synthetic resin is not limited to a particular type, it is particularly preferable to use a polyamide resin in which polyamide MXD6 is used as a base resin or a nylon 6.

Attachment Structure of Sub-Air Chamber Member

Next, a description will be given of a structure for attaching the sub-air chamber member 10 (see FIG. 1) to the rim 11 (see FIG. 1).

As shown in FIG. 3, the bottom portion 25b and the side portions 25c of the body portion 13 of the sub-air chamber member 10 are respectively bonded to the outer peripheral surface 11d of the well portion 11c and the side surfaces 14 of the vertical walls 15 with an adhesive 21.

Examples of the adhesive 21 include: thermoplastic resin-based adhesives such as ethylene vinyl acetate (hot-melt) resins; thermosetting resin-based adhesives such as epoxy resins, polyurethane resins, acrylic resins, and (polyaromatic) polyamide resins; and elastomer-based adhesives such as synthetic rubbers and thermoplastic elastomers. However, the adhesive 21 is not limited only to the foregoing.

Incidentally, the hardening process of the adhesive 21 is not limited to a particular type of process. However, chemical-reaction based processes are preferred among others.

The adhesive 21 can be coated on either the sub-air chamber member 10 or the rim 11. Alternatively, the adhesive 21 can be coated on both the sub-air chamber member 10 and the rim 11.

Examples of the method of coating the adhesive 21 include a bar coating method, a roll coating method, a spray coating method, a brush coating method, a hot melting method, and the like. However, the coating method is not limited to the foregoing.

Next, the film thicknesses of the adhesive 21 will be described.

As shown in FIG. 3, the adhesive 21 provided between the sub-air chamber member 10 and the rim 11 is in the form of a film continuously extending over the outer peripheral surface 11d of the well portion 11c and the side surfaces 14 of the vertical walls 15. This film entirely fills the above-described gap defined between the body portion 13 and the well portion 11c.

Figure 4:
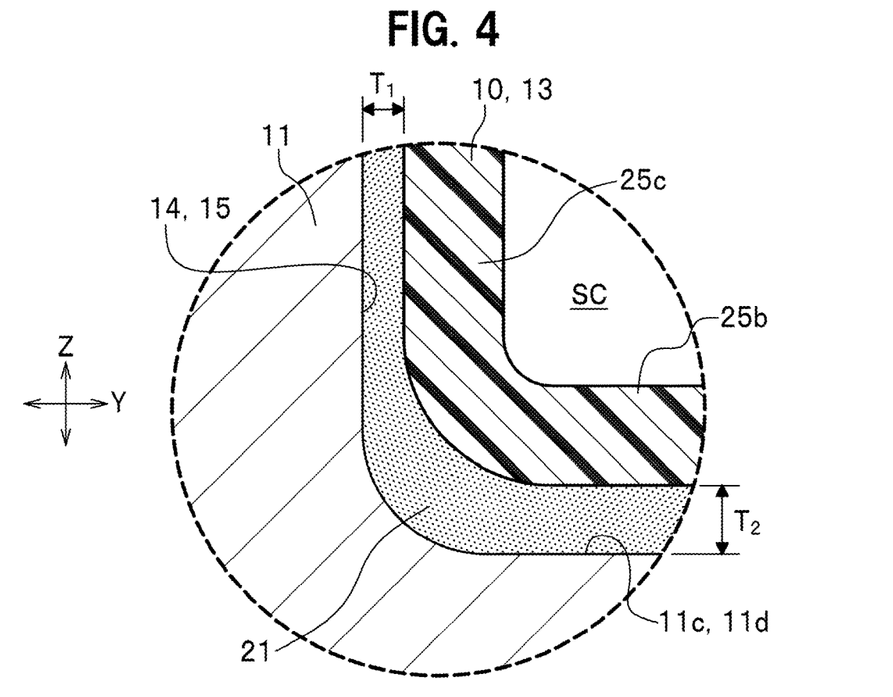
FIG. 4 is a partially enlarged view of a portion indicated with arrow IV in FIG. 3.

FIG. 4 is a partially enlarged view of the portion indicated with arrow IV in FIG. 3. Constituent elements in FIG. 4 which are the same as those in FIG. 3 will be denoted by the same reference signs and detailed descriptions thereof will be omitted.

As shown in FIG. 4, a film thickness T1 of the adhesive 21 on the side surface 14 of each vertical wall 15 is smaller than a film thickness T2 of the adhesive 21 on the outer peripheral surface 11d of the well portion 11c.

By controlling the film thicknesses T1 and T2 of the adhesive 21 as described above, the fixation strength of the sub-air chamber member 10 to the rim 11 is dramatically improved.

The reason for this is explained as follows. A centrifugal force F (see FIG. 3) applied to the sub-air chamber member 10 by high-speed revolutions of the tire (not shown) acts on the adhesive 21 on the side surface 14 in a shearing direction and acts on the adhesive 21 on the outer peripheral surface 11d in a peeling direction.

In this regard, the thinner the adhesive 21, the more resistance to the shearing stress the adhesive 21 has, while the thicker the adhesive 21, the more resistance to the peeling stress the adhesive 21 has. In other words, the vehicle wheel 1 of the present embodiment improves both the "shear strength" of the adhesive 21 on each side surface 14 and the "peeling strength" of the adhesive 21 on the outer peripheral surface 11d by satisfying the condition: film thickness T1<film thickness T2. With this configuration, the fixation strength of the sub-air chamber member 10 to the rim 11 is dramatically improved.

Figure 5:
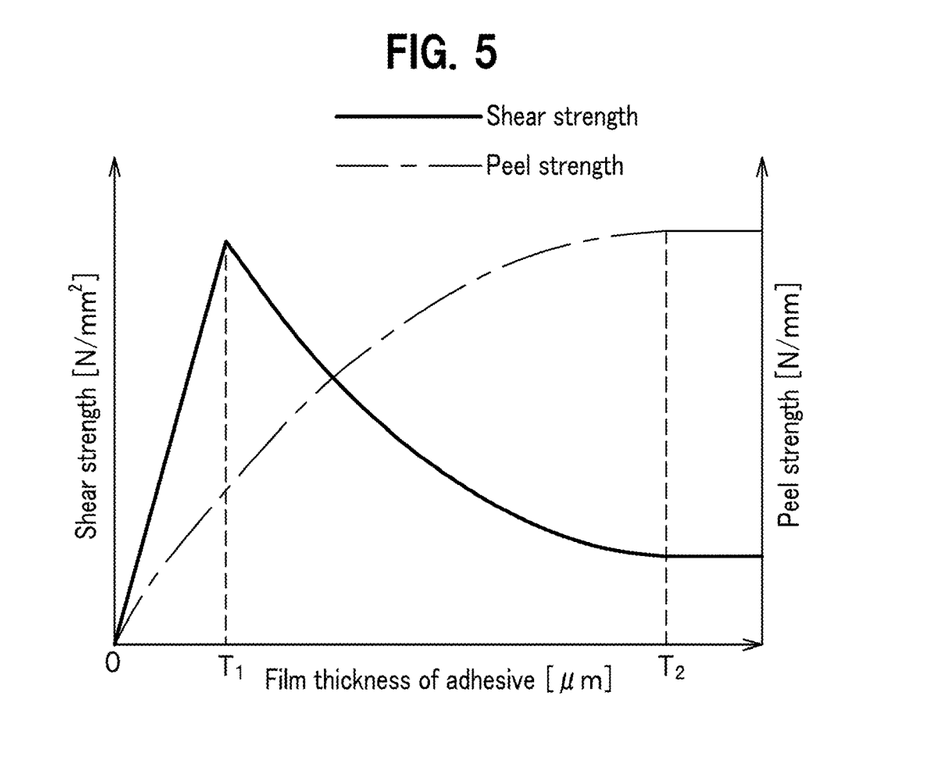
FIG. 5 is a graph showing a relation of the film thickness of an adhesive interposed between the sub-air chamber member and a rim to the shear strength and the peeling strength of the adhesive.

More preferable film thicknesses of the adhesive 21 among those satisfying "film thickness T1<film thickness T2" can be selected as follows. FIG. 5 is a graph showing a relation of the film thickness [μm] of the adhesive 21 interposed between the sub-air chamber member 10 and the rim 11 shown in FIG. 3 to the shear strength [N/mm$^2$] and the peeling strength [N/mm] of the adhesive 21. Here, the shear strength [N/mm$^2$] complies with JIS K6850 (1999) while the peeling strength [N/mm] complies with JIS K6854 (1999).

As shown in FIG. 5, the shear strength [N/mm$^2$] gradually increases as the film thickness of the adhesive 21 (see FIG. 3) becomes thicker from 0 [μm] and then turns down after a certain yield point (see the film thickness T1). In other words, the shear strength [N/mm$^2$] reaches a maximum at the yield point (see the film thickness T1).

As shown in FIG. 5, the peeling strength [N/mm] gradually increases as the film thickness grows thicker from 0 [μm] and then reaches a saturation point (seethe film thickness T2). In other words, the peeling strength [N/mm] reaches a maximum at the saturation point (see the film thickness T2).

Therefore, in the case of the sub-air chamber member 10 (see FIG. 3) of the present embodiment, the fixation strength of the sub-air chamber member 10 to the rim 11 reaches a maximum by setting the film thickness of the adhesive 21 (see FIG. 3) on each vertical wall 15 (see FIG. 3) to the value T1 shown in FIG. 5 while setting the film thickness of the adhesive 21 on the outer peripheral surface 11d (see FIG. 3) to the value T2 shown in FIG. 5.

Incidentally, the relations among the shear strength [N/mm$^2$], the peeling strength [N/mm], and the film thicknesses [μm] of the adhesive 21 shown in FIG. 5 can be obtained by computer-aided engineering (CAE) conducted in advance on the basis of the material of the rim 11 to be used and the type of the adhesive 21.

In addition, in the above-described attachment structure of the sub-air chamber member 10 (see FIG. 3), it is preferable to roughen the surfaces to which the adhesive 21 (see FIG. 3) is to be applied. In particular, it is more preferable that such surfaces be laser-etched.

In particular, it is more preferable to laser-etch the surface where the adhesive 21 applied thereto is subjected to the shearing force due to the centrifugal force F (see FIG. 3). Therefore, it is more preferable that the side surfaces 14 of the vertical walls 15 and/or the side portions 25c of the body portion 13 shown in FIG. 3 be laser-etched.

Figure 6:
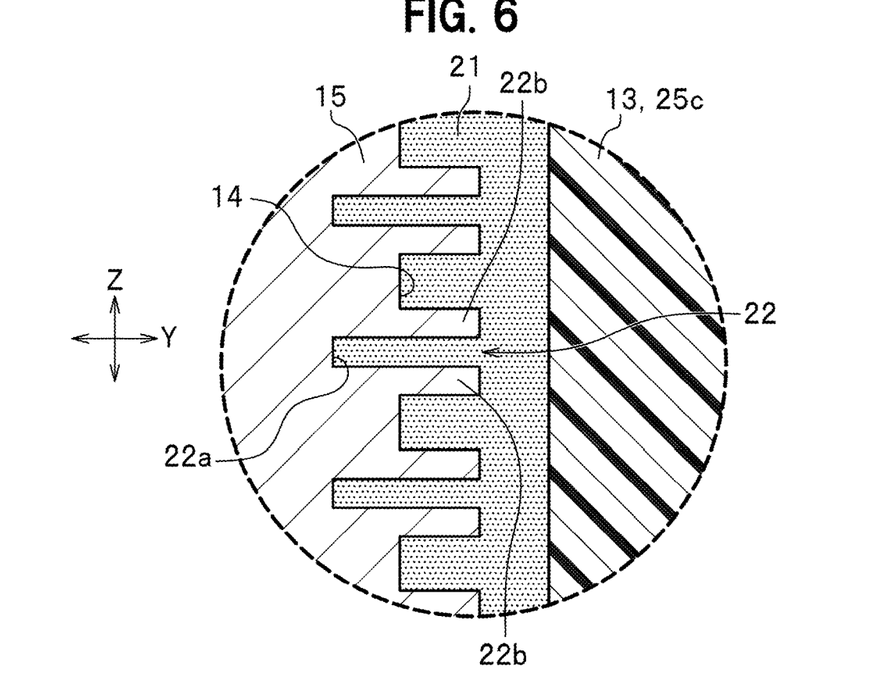
FIG. 6 is an explanatory diagram of a laser-etched surface of a vertical wall of a well portion.

FIG. 6 is an explanatory diagram of a laser-etched surface 22 of the vertical wall 15. In FIG. 6, reference sign 25c denotes the side portion (side plate) of the body portion 13, and reference sign 21 denotes the adhesive.

As shown in FIG. 6, the side surface 14 of the vertical wall 15 includes a laser-etched surface 22.

The laser-etched surface 22 includes etched grooves 22a and ridges 22b.

The etched grooves 22a in the present embodiment are formed on the side surface 14 when the side surface 14 is scanned in one direction with a YAG laser, for instance. Each etched groove 22a has a predetermined depth and extends from the front side toward the back side of the drawing plane of FIG. 6.

The ridges 22b of this embodiment are bulges which are formed with a predetermined height on two upper peripheral portions of each etched groove 22a located opposite in the width direction thereof and which extend along the etched groove 22a.

The above-described laser-etched surface 22 is formed by scanning the side surface 14 with a YAG laser at a predetermined hatching pitch, for example. Specifically, the YAG laser bores the etched grooves 22a to a predetermined depth, and the eluted material or the like generated in the course of boring deposits and becomes hardened on the two upper peripheral portions of each of the etched grooves 22a, to form the ridges 22b with a predetermined height.

Here, the direction of extension of the etched grooves 22a and the ridges 22b is in the wheel circumferential direction X in the present embodiment. However, the direction of extension is not limited only to the wheel circumferential direction X.

In the present embodiment, as such laser-etched surface 22 is created on each side surface 14, the adhesive 21 can be filled into each etched groove 22a and filled between the ridges 22b. Moreover, although illustration is omitted, on the laser-etched surface 22, tip end portions of the ridges 22b on both sides of each etched groove 22a are deformed such that the side surfaces of the ridges 22b overhang the etched groove 22a and the tip end portions are partially connected to each other to form an arch over the etched groove 22a.

As a result, an anchor structure of the laser-etched surface 22 is constructed on the laser-etched surface 22 by a portion of the adhesive 21 filled deep into the etched grooves 22a and other portions of the adhesive 21 engaged with the overhanging portions and the arches.

Accordingly, the fixation strength of the sub-air chamber member 10 to the rim 11 is further increased.

Here, it is needless to say that the above-described laser-etched surface 22 can also be formed on each side portion 25c of the body portion 13 as described above.

Figure 7:
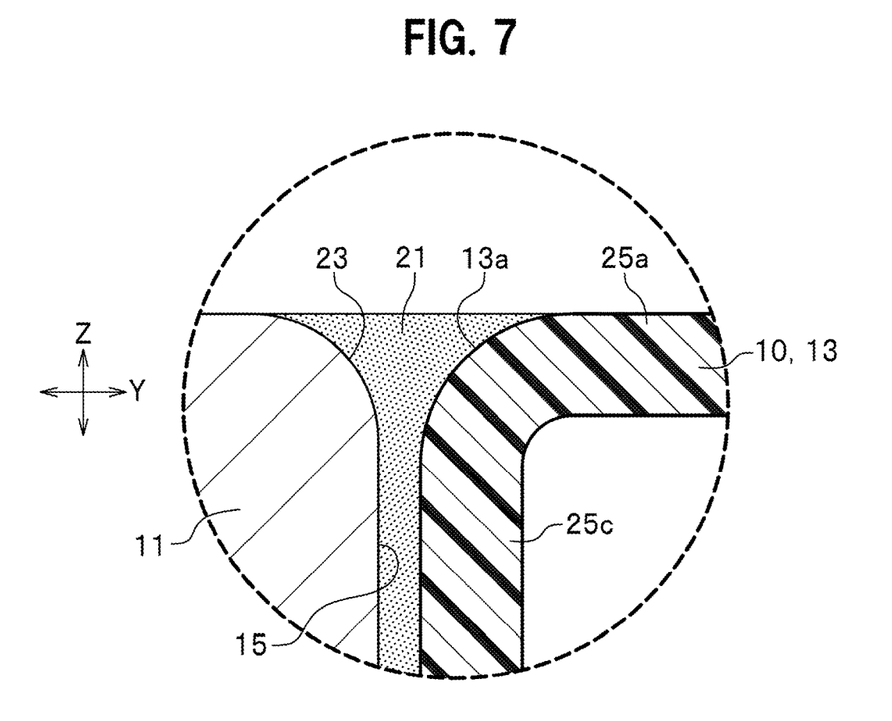
FIG. 7 is a partially enlarged view of a portion indicated with arrow VII in FIG. 3.

FIG. 7 is a partially enlarged view of the portion indicated with arrow VII in FIG. 3.

As shown in FIG. 7, a round portion 13a is formed at a portion connecting between the top portion 25a and the side portion 25c of the body portion 13. In addition, a round portion 23 is also formed at an upper portion of the vertical wall 15.

Moreover, an upper portion of the adhesive 21 located between the vertical wall 15 and the side portion 25c spreads over the round portion 13a and the round portion 23, thus covering the round portions 13a and 23 from above.

The fixation strength of the sub-air chamber member 10 to the rim 11 is further improved by the portion of the adhesive 21 that covers the round portions 13a and 23 from above.

Operation and Effects

Next, the operation and effects that can be achieved by the vehicle wheel 1 of the present embodiment will be described.

In the vehicle wheel 1 of the present embodiment, the sub-air chamber member 10 is attached to the rim 11 with the adhesive 21.

Such vehicle wheel 1 does not need to undergo cutting work in order to form circumferential grooves for attaching the sub-air chamber member 10 to the rim 11, unlike the conventional vehicle wheel (see Japanese Patent Application Publication No. 2012-45971, for instance). Therefore, with this vehicle wheel 1, the manufacturing process can be simplified and the manufacturing cost can be reduced as compared to the conventional vehicle wheel.

In this vehicle wheel 1, the sub-air chamber member 10 is bonded to the vertical walls 15 and the outer peripheral surface 11d of the well portion 11c with the adhesive 21. In other words, the bottom portion 25b (bottom plate) and the pair of side portions 25c (side plates) of the body portion 13 are glued to the rim 11 along the wheel circumferential direction X. Accordingly, the body portion 13 is surrounded and rigidly supported by the outer peripheral surface 11d of the well portion 11c and the pair of vertical walls 15 formed on this outer peripheral surface 11d. Therefore, the vehicle wheel 1 allows the body portion 13 to have very high rigidity.

In this vehicle wheel 1, the centrifugal force F applied to the sub-air chamber member 10 by high-speed revolutions of the tire acts on the adhesive 21 on each side surface 14 in the shearing direction. At the same time, the centrifugal force F acts on the adhesive 21 on the outer peripheral surface 11d in the peeling direction. The thinner the adhesive 21, the more resistance to the shearing stress the adhesive 21 has, while the thicker the adhesive 21, the more resistance to the peeling stress the adhesive 21 has.

That is to say, the vehicle wheel 1 can dramatically improve the fixation strength of the sub-air chamber member 10 to the rim 11 by making the film thickness T1 of the adhesive 21 on the side surface 14 of each vertical wall 15 smaller than the film thickness T2 of the adhesive 21 on the outer peripheral surface 11d.

In addition, in the vehicle wheel 1, the surfaces to which the adhesive 21 is to be applied include the laser-etched surfaces 22.

Such vehicle wheel 1 can further improve the fixation strength of the sub-air chamber member 10 to the rim 11 due to an anchoring effect of the adhesive 21 attributed to each laser-etched surface 22, and due to an effect of enhancement in the wettability associated with a surface free energy structure of a metallic solid portion (see Young's contact angle equation).

An embodiment of the present invention has been described above. It is to be noted, however, that the present invention is not limited only to the above-described embodiment but can also be embodied in various other modes.

The above-described embodiment assumes that the sub-air chamber member 10 (see FIG. 3) is made of a synthetic resin only. However, the sub-air chamber member 10 may instead be made of two or more types of different materials.

Figure 8:
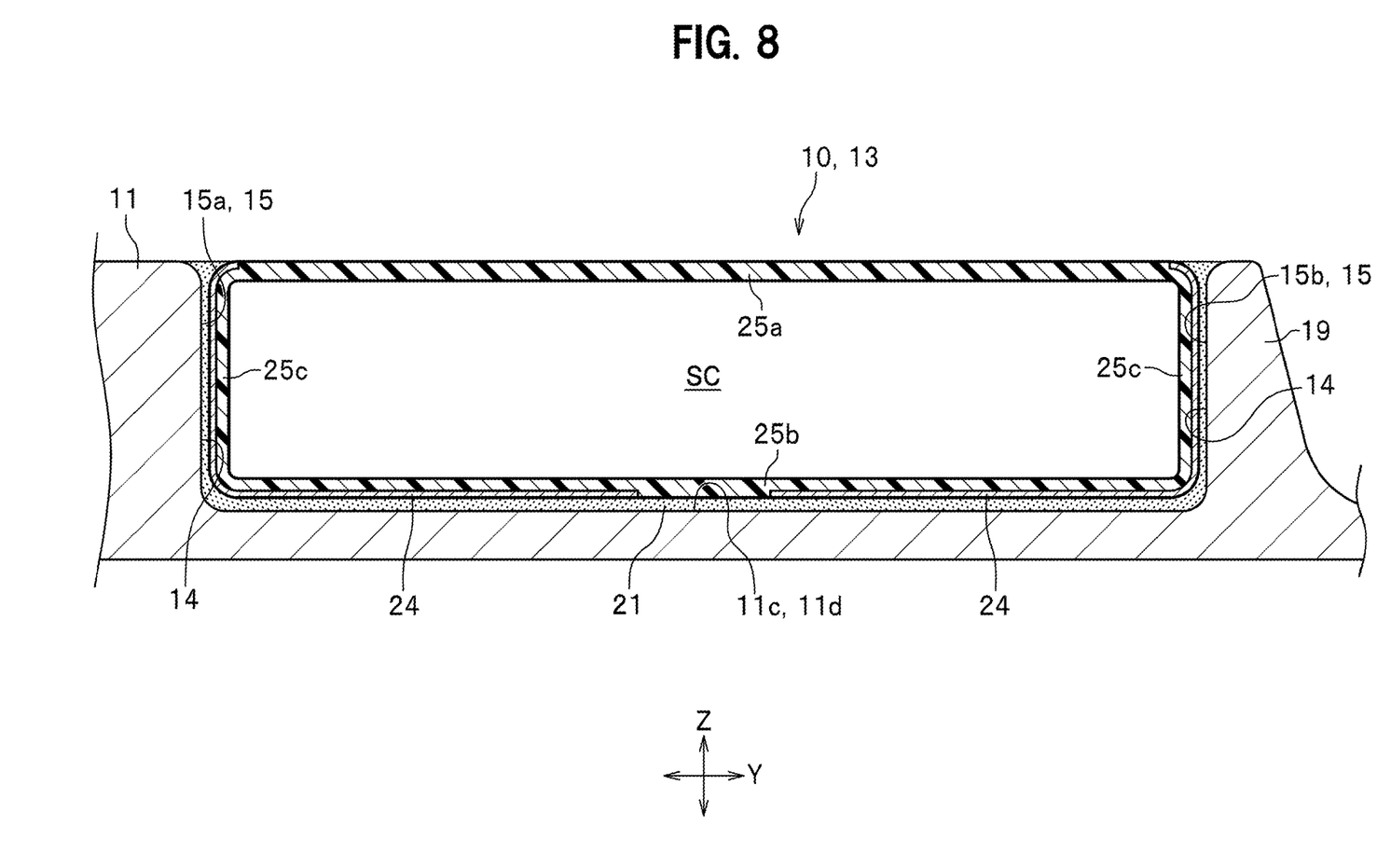
FIG. 8 is an enlarged cross-sectional view of a sub-air chamber member according to a first modification.

FIG. 8 is a partial cross-sectional view of the sub-air chamber member 10 according to a first modification formed of two different types of materials. FIG. 8 is a cross-sectional view corresponding to FIG. 3. Note that constituent elements shown in FIG. 8 which are the same as those in FIG. 3 will be denoted by the same reference signs and detailed descriptions thereof will be omitted.

As shown in FIG. 8, the body portion 13 of the sub-air chamber member 10 has metal plates 24 on surfaces of the body portion 13 that are opposed to the outer peripheral surface 11d of the well portion 11c and to the side surfaces 14 of the vertical walls 15. These metal plates 24 each serve as a flat member for adhesion (flat adhesion member).

These metal plates 24 (flat adhesion members) are assumed to be made of the same material as the material of the rim 11. However, the present invention is not limited to this configuration.

These metal plates 24 each have a flat surface opposed to the outer peripheral surface 11d and used for adhesion to the adhesive 21. The flat surface is a surface of the metal plate 24 planarized to have a flatness of 1 μm or less by electrolytic polishing or buff polishing, for example.

The surfaces of the metal plates 24 which are opposed to the side surfaces 14 have been subjected to the aforementioned planarization processing and then further to the laser etching, and thus have the same structure as the laser-etched surface 22 (see FIG. 6).

The above-described sub-air chamber member 10 can be obtained by insert molding with the metal plates 24 being disposed inside a mold in advance.

When the vehicle wheel 1 (see FIG. 1) is provided with the above-described sub-air chamber member 10 shown in FIG. 8, the film thicknesses of the adhesive 21 can be easily controlled because the surface of the sub-air chamber member 10 that is opposed to the rim 11 is flat. Accordingly, the fixation strength of the sub-air chamber member 10 to the rim 11 of the vehicle wheel 1 can be reliably increased.

Moreover, with this vehicle wheel 1, the rigidity of the body portion 13 of the sub-air chamber member 10 is further enhanced due to a reinforcement effect of the metal plates 24.

Furthermore, with this vehicle wheel 1, the fixation strength of the sub-air chamber member 10 to the rim 11 is further enhanced, because the surfaces of the metal plates 24 which are respectively opposed to the side surfaces 14 each include the laser-etched surface 22.

Figure 9:
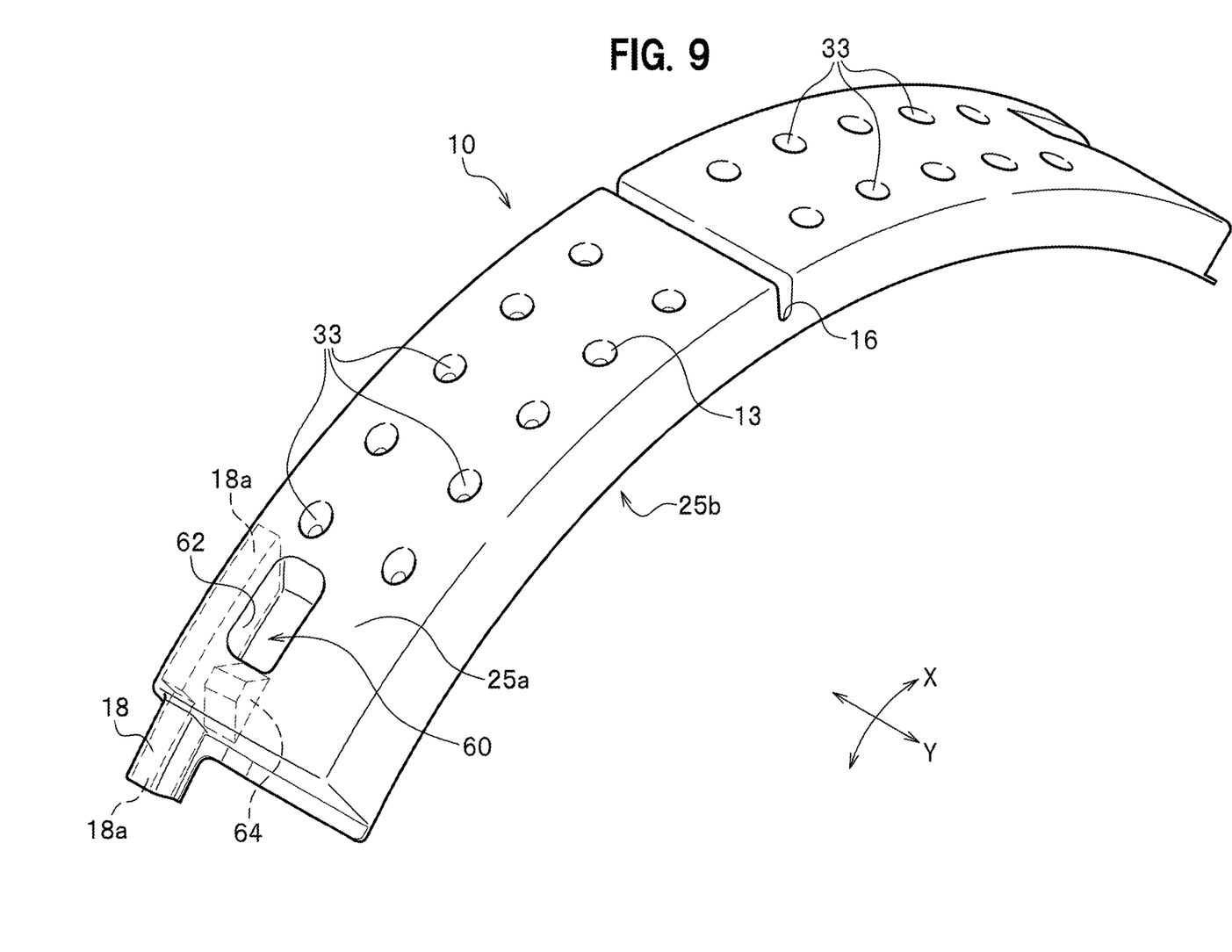
FIG. 9 is an overall perspective view of a sub-air chamber member according to a second modification.
Figure 10:
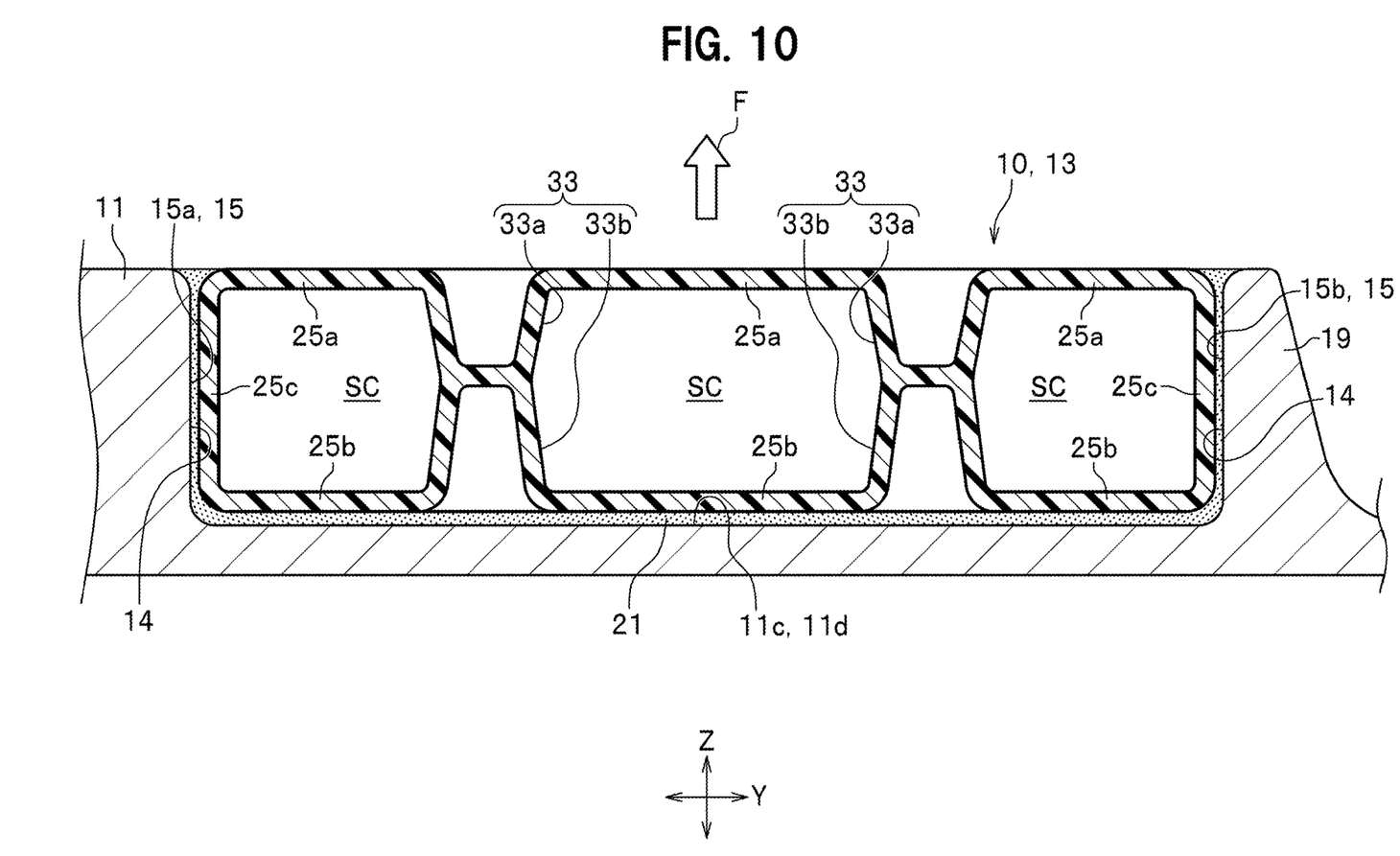
FIG. 10 is an enlarged cross-sectional view of the sub-air chamber member according to the second modification.

FIG. 9 is an overall perspective view of a sub-air chamber member 10 according to a second modification, which sub-air chamber member 10 includes bridges 33. FIG. 10 is an explanatory configuration diagram of the sub-air chamber member 10 of the second modification. FIG. 10 is a cross-sectional view corresponding to FIG. 3. Note that constituent elements in FIGS. 9 and 10 which are the same as those in FIG. 3 will be denoted by the same reference signs and detailed descriptions thereof will be omitted.

As shown in FIG. 9, the sub-air chamber member 10 according to the second modification includes a plurality of bridges 33 (ten bridges 33 in this embodiment) arranged at regular intervals in the wheel circumferential direction X. The bridges 33 are arranged in two rows in the wheel width direction Y.

As shown in FIG. 10, each bridge 33 has an upper joining portion 33a and a lower joining portion 33b which are joined together at a substantially central position between the top portion 25a and the bottom portion 25b.

Here, the upper joining portion 33a is a portion of the top portion 25a that is partially recessed toward the bottom portion 25b. On the other hand, the lower joining portion 33b is a portion of the bottom portion 25b that is partially recessed toward the top portion 25a.

The above-described bridge 33 has a substantially columnar shape and partially connects between the top portion 25a and the bottom portion 25b.

As a result, the top portion 25a of the sub-air chamber member 10 (body portion 13) is connected to the bottom portion 25b, which is glued to the outer peripheral surface 11d of the well portion 11c to be held thereon, via the bridges 33. In other words, the top portion 25a is rigidly supported on the outer peripheral surface 11d of the well portion 11c via the bridges 33 and the bottom portion 25b.

Thus, the top portion 25a can be reliably prevented from bulging in a centrifugal direction even when the centrifugal force F acts on the sub-air chamber member 10.

Therefore, the sub-air chamber member 10 shown in FIG. 10 can prevent changes in the volume of the sub-air chamber SC more reliably. In other words, the vehicle wheel 1 (see FIG. 1) including the above-described sub-air chamber member 10 can more reliably maintain the designed appropriate resonance frequency of the sub-air chamber member 10.

As to the second modification, the sub-air chamber member 10 has been described as having the two rows of bridges 33 (see FIG. 9). However, the number of the bridges 33 of the vehicle wheel 1 can be reduced because the sub-air chamber member 10, per se, can exhibit high rigidity as mentioned above.

Figure 11:
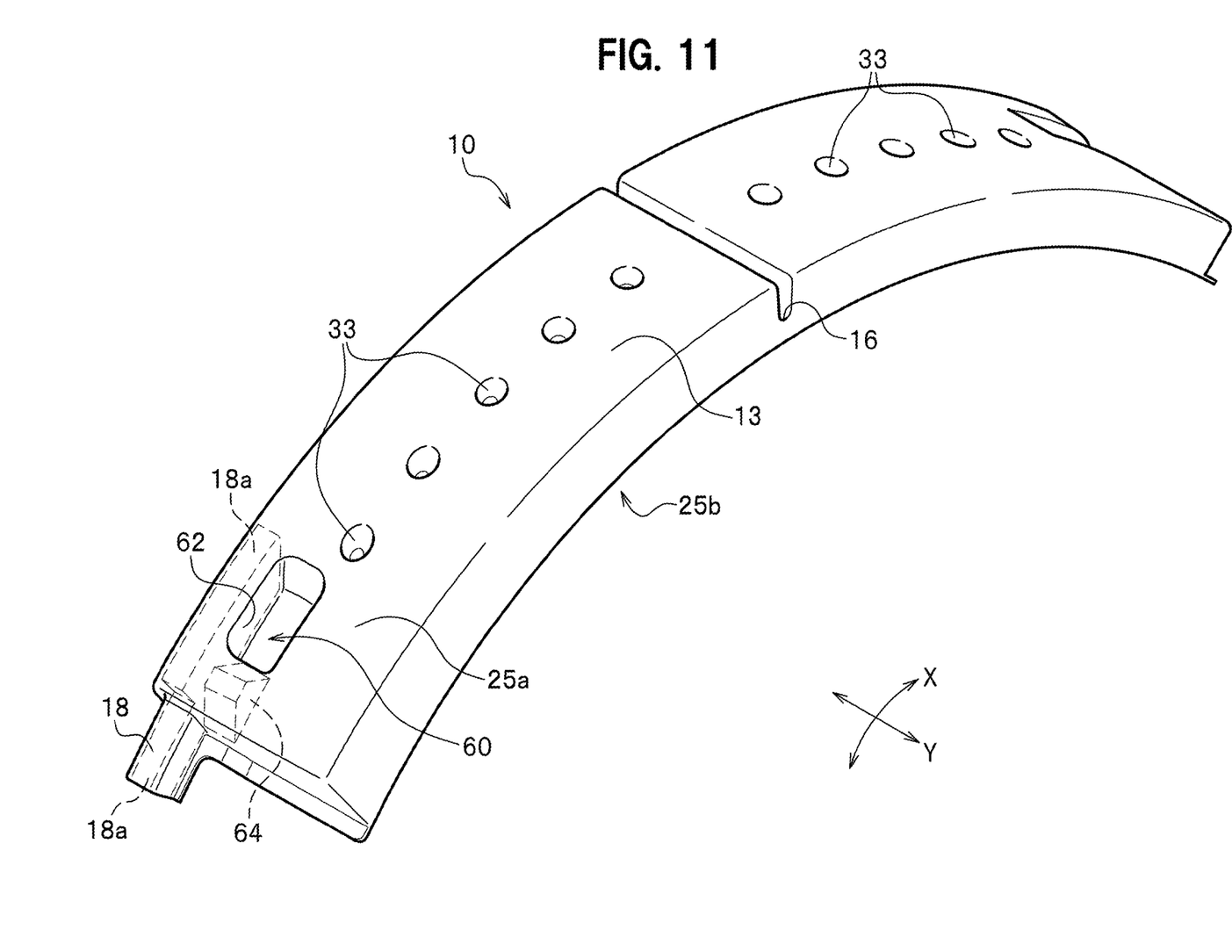
FIG. 11 is an overall perspective view of a sub-air chamber member according to a third modification.
Figure 12:
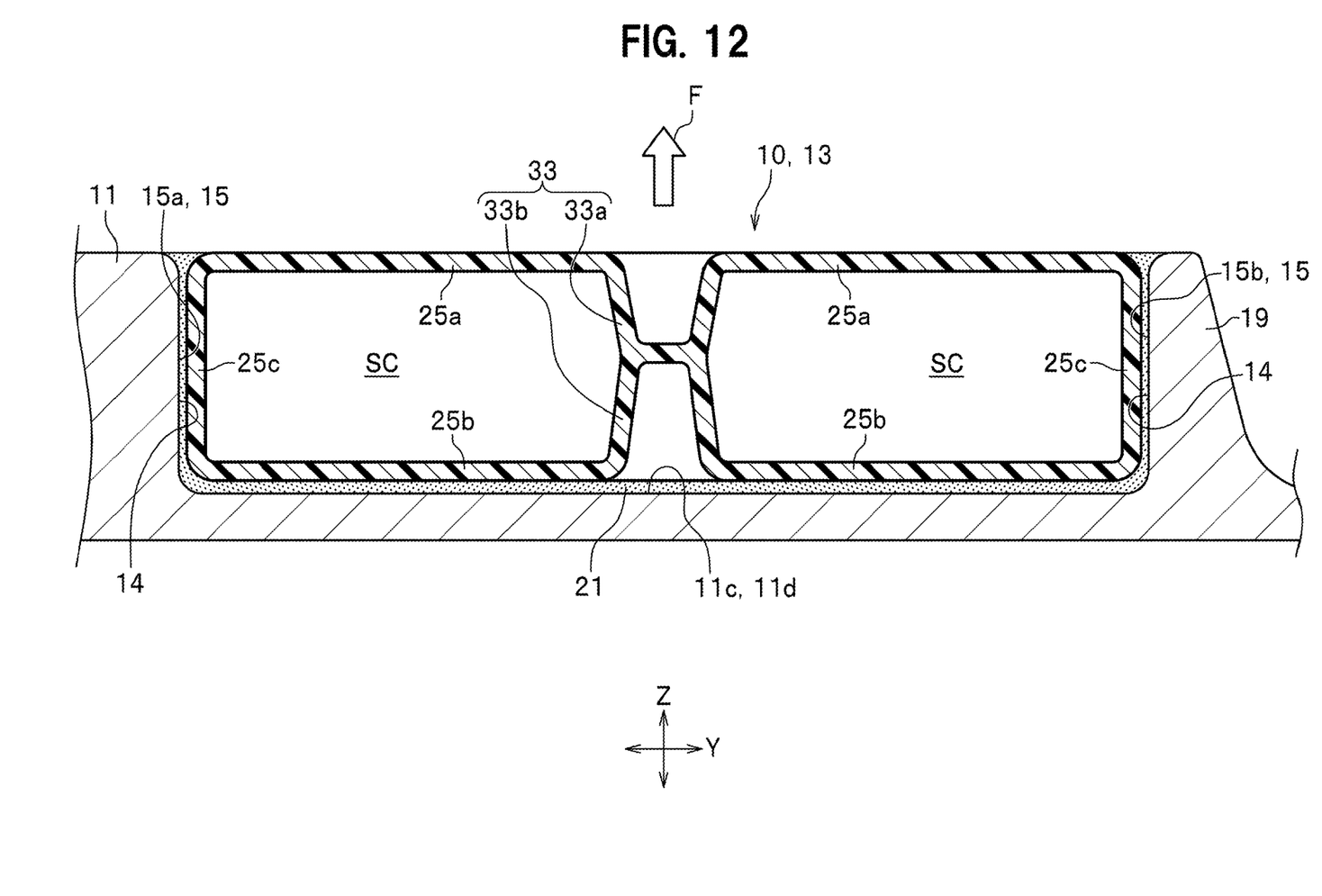
FIG. 12 is an enlarged cross-sectional view of the sub-air chamber member according to the third modification.

FIG. 11 is an overall perspective view of a sub-air chamber member 10 according to a third modification, which sub-air chamber member 10 includes the bridges 33. FIG. 12 is an explanatory configuration diagram of the sub-air chamber member 10 of the third modification. FIG. 12 is a cross-sectional view corresponding to FIG. 3. Note that constituent elements in FIGS. 11 and 12 which are the same as those in FIG. 3 will be denoted by the same reference signs and detailed descriptions thereof will be omitted.

As shown in FIG. 11, the sub-air chamber member 10 according to the third modification includes bridges 33 arranged in one row in the wheel circumferential direction X, at positions located substantially centrally in the wheel width direction Y of the body portion 13.

As shown in FIG. 12, each bridge 33 has an upper joining portion 33a and a lower joining portion 33b which are joined together at a substantially central position between the top portion 25a and the bottom portion 25b.

Each bridge 33 described above has a substantially columnar shape and partially connects between the top portion 25a and the bottom portion 25b, like the bridges 33 in the sub-air chamber member 10 according to the second modification (see FIG. 10).

The above-described sub-air chamber member 10 according to the third modification (see FIG. 12) has a smaller number of bridges 33 than the sub-air chamber member 10 according to the second modification (see FIG. 10), and the structure of the third modification is thus simplified. As a result, the mold for molding this sub-air chamber member 10 can also be simplified, whereby the manufacturing cost can be reduced accordingly.

Moreover, as compared to the sub-air chamber member 10 according to the second modification (see FIG. 10), the sub-air chamber member 10 according to the third modification (see FIG. 12) requires a smaller amount of raw material (e.g., synthetic resin) for molding the sub-air chamber member 10, accordingly to the number of the reduced bridges 33. For this reason, the sub-air chamber member 10 according to the third modification can be reduced in weight as compared to the sub-air chamber member 10 according to the second modification (see FIG. 10).

As a result, assuming that a rotational speed of the tire (angular velocity ω of the sub-air chamber member 10) is the same, the centrifugal force ($mr\omega^2$, where m is the mass of the sub-air chamber member 10 and r is the distance of the sub-air chamber member 10 from the center of rotation) acting on the sub-air chamber member 10 according to the third modification is smaller than that of the sub-air chamber member 10 according to the second modification.

Therefore, the vehicle wheel 1 (see FIG. 1) with the sub-air chamber member 10 according to the third modification (see FIG. 12) has improved performance of holding the sub-air chamber member 10 on the rim 11. Due to the improved performance of the vehicle wheel 1 to hold the sub-air chamber member 10 on the rim 11, the adhesive 21 to be used can be selected from a wider variety of types of adhesives.

In addition, the sub-air chamber member 10 according to any of the second modification and the third modification described above (see FIG. 10 and FIG. 12) may also include the metal plates 24 (see FIG. 8) each serving as a flat adhesion member like the sub-air chamber member 10 of the first modification (see FIG. 8).

What is claimed is:
1. A vehicle wheel comprising:
   a well portion having an outer peripheral surface on which a vertical wall extending in a radial direction of the vehicle wheel from the outer peripheral surface is formed, the vertical wall extending in a circumferential direction of the vehicle wheel; and
   a Helmholtz resonator attached to a side surface of the vertical wall and to the outer peripheral surface of the well portion with an adhesive, wherein a first film thickness of the adhesive is smaller than a second film thickness of adhesive, the first film thickness of the adhesive being between the side surface of the vertical wall and an adjacent surface of a side portion of the Helmholtz resonator to which the vertical wall is adhered by the adhesive, and the second film thickness of the adhesive being between the outer peripheral surface of the well portion and an adjacent surface of a bottom portion of the Helmholtz resonator to which the outer peripheral surface of the well portion is adhered by the adhesive.

2. A vehicle wheel comprising:
a well portion having an outer peripheral surface on which a vertical wall extending in a radial direction of the vehicle wheel from the outer peripheral surface is formed, the vertical wall extending in a circumferential direction of the vehicle wheel; and
a Helmholtz resonator attached to a side surface of the vertical wall and to the outer peripheral surface of the well portion with an adhesive,
wherein the Helmholtz resonator includes a bottom portion located on and facing the outer peripheral surface of the well portion with a metal plate as a flat adhesion member disposed between the bottom portion of the Helmholtz resonator and the outer peripheral surface of the well portion.

3. The vehicle wheel according to claim 2, wherein the metal plate is made of a same material as the well portion.

4. The vehicle wheel according to claim 1,
wherein at least one of the outer peripheral surface of the well portion, the side surface of the vertical wall, the adjacent surface of the side portion of the Helmholtz resonator to which the vertical wall is adhered by the adhesive, and the adjacent surface of the bottom portion of the Helmholtz resonator to which the outer peripheral surface of the well portion is adhered by the adhesive, is laser-etched.

5. The vehicle wheel according to claim 2,
wherein at least one of the outer peripheral surface of the well portion, the side surface of the vertical wall, and a surface of the Helmholtz resonator joined with the adhesive to the outer peripheral surface or the side surface is laser-etched.

* * * * *